United States Patent
Kamiyama

[11] 3,886,329
[45] May 27, 1975

[54] PRESET COUNTER APPARATUS
[75] Inventor: Hiromitsu Kamiyama, Tokyo, Japan
[73] Assignee: Konishiroku Photo Industry Co., Ltd., Tokyo, Japan
[22] Filed: Jan. 16, 1974
[21] Appl. No.: 433,815

[30] Foreign Application Priority Data
  Jan. 18, 1973  Japan.................................. 48-7389

[52] U.S. Cl. ..... 235/92 SB; 235/92 CA; 235/92 PE; 235/92 R; 355/14
[51] Int. Cl...................... H03k 21/36; G03b 27/06
[58] Field of Search ....... 235/92 CA, 92 PD, 92 SB, 235/92 PE, 132 E; 355/14

[56]  References Cited
  UNITED STATES PATENTS
  3,682,544  8/1972  Glaser................................. 355/14
  3,686,483  8/1972  Umahashi....................... 235/92 PE Primary Examiner—Joseph M. Thesz, Jr.
Attorney, Agent, or Firm—James E. Nilles

[57] ABSTRACT

The specification discloses a preset counter apparatus comprising a comparator circuit for producing a first control signal when a value to be compared is smaller than a reference value and producing a second control signal when said value to be compared is equal to or greater than said reference signal, a control means actuated by said second control signal from said comparator circuit to control operation of a utilization machine, a preset means to preset a preselected number of said machine operations and supply said preset information to said comparator circuit as said reference value, means operatively interlocked with said machine operations to generate signals representative of said operations, a counter circuit to count said operation representing signals and apply the count information thereof to said comparator circuit as said value to be compared with said reference value, and a start signal means to supply a machine operation start signal to said counter circuit.

The counter circuit is so arranged as to usually hold therein said preset information from said preset means and, upon application of a signal from said start signal means, to clear said preset information and begin to count the number of signal from said operation representing signal means starting from zero state.

Further, the counter circuit, upon beginning said count, being maintained in the state in which said preset information is cleared by means of said first control signal from said comparator circuit and, upon receiving said second control signal from said comparator circuit, being restored to said usual state, and at the same time resetting said start signal means to the original state before the operation was initiated.

6 Claims, 3 Drawing Figures

PRESET COUNTER APPARATUS

BACKGROUND OF THE INVENTION

The present invention relates to an improvement of a preset counter.

In a conventional preset counter such as, for example, a copy counter of a copying machine as shown in FIG. 1, a signal generator 1 is provided which is interlocked with copying operations or movements of the machine such as the rotation of a photo-printing drum or the like to produce a signal representing the machine operation for every copying cycle, which signal is sequentially counted or accumulated by a counter circuit 2. A preset means 3 in which a predetermined number of sheets to be printed is preset is also provided. The count information from the counter circuit 2 and the present count information from the preset means 3 are both applied to a coincidence circuit 4 which, upon detection of the coincidence between the above count informations, produces an output to stop the further operation of the copying machine by means of a control means 5. Accordingly, in case several pulses representative of corresponding times operations of the copying machine have been entered into the counter circuit 2 for a relatively short time interval or if the preset means 3 is inadvertently actuated just before the occurrence of the coincidence to thereby reduce the initially set predetermined number of counts, it becomes impossible to detect the coincidence in the circuit 4, so that the copying machine continues to operate beyond the preset number of cycle. Further, because the arrangement is made such that a signal produced by a start signal means 6 in response to the actuation of a printing push button to inform the initiation of the copying operation is applied directly to the coincidence detector circuit 4, there arises a possibility that the machine may operate erroneously if noise is mixed to the start signal. Besides, when the system is in the preset state that the machine is in an unoperation, the counter circuit 2 steadily remains in the zero state. For this reason, a count information display means 7 to indicate the count state of the counter circuit 2 can not be utilized to display the preset count information. Those are disadvantages of the hitherto known counter apparatus for the copying machine.

An object of the present invention is to provide an improved preset counter apparatus from which the disadvantages of the conventional counter such as above mentioned are eliminated.

Another object of the invention is to provide a counter apparatus which assures the correct operation of the utilization apparatus such as a copying machine nevertheless of possible accidental erroneous operations or actuations of counters.

Further object of the invention is to provide an improved counter apparatus wherein the application of the start signal is effected independently from the comparator or coincidence circuit for which accurate operation is inherently required, whereby the possible erroneous operations caused by noises can be inhibited.

The above and other objects, features and advantage will become apparent from the following description of a preferred embodiment of the invention. The description makes reference to the drawing.

DETAILED DESCRIPTION OF THE INVENTION

Figure 1:
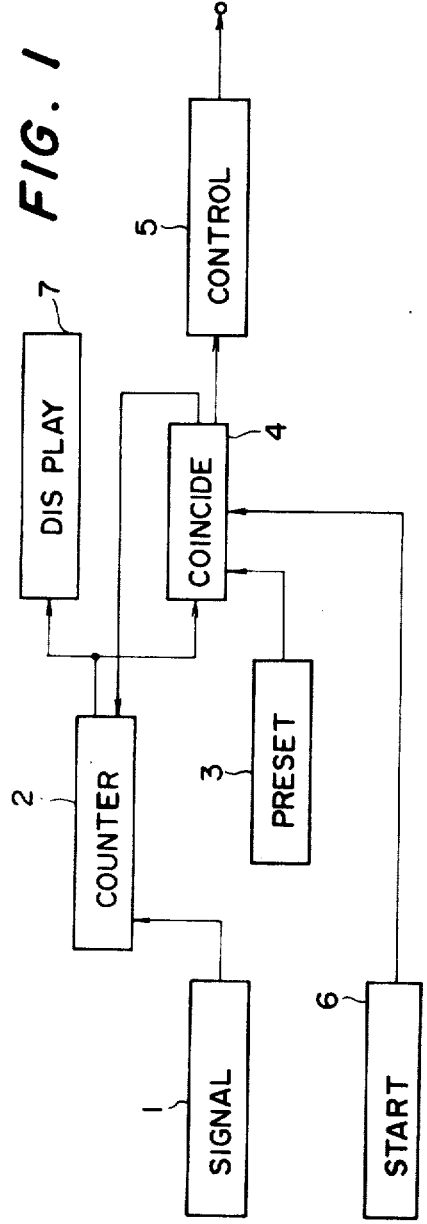
FIG. 1 is a schematic block diagram to illustrate the operation of a hitherto known counter apparatus.
Figure 2:
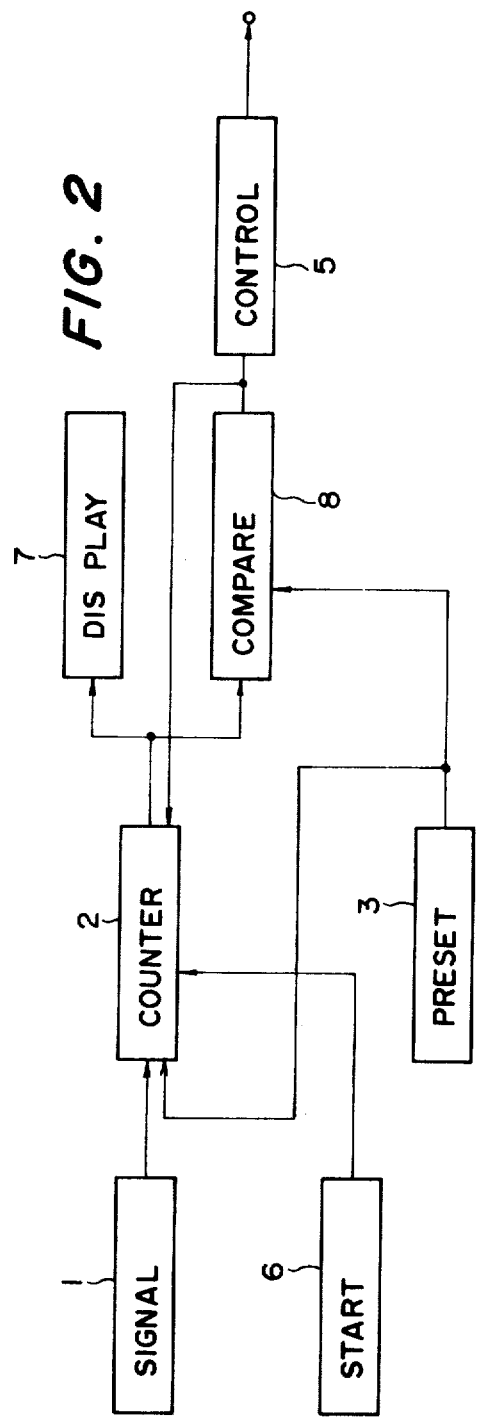
FIG. 2 is a schematic block diagram of a preset counter apparatus according to the invention.

In FIG. 2, the same reference numerals as those used in FIG. 1 denote the same or equivalent components. According to the invention, the count information from a counter circuit 2 is applied to a comparator circuit 8 along with the preset information from a preset means 3. The comparator circuit 8 is so constructed as to produce a first control signal when the value to be compared (count information) is smaller than a reference value (preset information) and produce a second control signal when the former value is equal to or greater than the reference value. Those two control signals are fed back to the counter circuit 2 and at the same time applied to a control means 5. The copying machine is maintained in the non-operative or stationary state only when the second control signal appears.

The arrangement of the counter circuit 2 as well as the operating relations between the circuit 2 and the preset means 3, comparator circuit 8 and the start signal means 6 are as follows. The counter circuit 2 will usually hold or store therein the preset information. However, when the signal from the start signal means 6 is applied, the counter circuit 2 is reset to clear the preset information and begins to count the signal pulses from the operation signaling means 1 starting from the zero state. Additionally, when the counter circuit 2 has begun to count, the first control signal from the comparator 8 will hold the circuit 2 in the state in which the preset information is cleared. The second control signal from the comparator circuit 8 will restore the counter circuit 2 to the usual state storing the preset information and reset the start signal means 6 to the original state before the actuation.

In copying operation, when the preset means 3 is set to the count corresponding to a selected number of copying sheets, the preset information thereof is fed to the comparator circuit 8 and the counter circuit 2. In this manner, the counter circuit 2 conveys the preset number of sheets to the count information display means 7 and the comparator circuit 8. Thus, the count information display means 7 can display the preset number of sheets as it is.

Because, at this time point, the value to be compared from the counter circuit 2 becomes equal to the reference value from the preset means 3, the comparator circuit 8 will produce the second control signal which is then applied to the control means 5 to hold the copying machine in the stop or stationary state.

On the other hand, the second control signal is fed back to the counter circuit 2, whereby the latter circuit 2 is held in the state storing the preset information therein. Operation of the apparatus is as following. The copying machine is actuated by pushing the printing button or the like, thereby the start signal means 6 will respond thereto and produce the start signal. At the same time, the operation signaling means 1 supplies the operation-representing-signal to the counter circuit 2, as a result of which the latter is reset to clear the stored preset information and begins to count the signal from the operation signaling means 1 starting from the zero state. The comparator circuit 8 as well as the display means 7 then receive corresponding count information from the circuit 2.

So far as the value to be compared (count information) is smaller than the reference value (preset information), the comparator circuit 8 produces the first control signal which is applied to the control means 5 and the counter circuit 2. The copying machine thus continues to remain in the operating state. At this time point, the counter circuit 2 is held by the first control signal in the state in which the preset information is cleared and hence the comparator circuit 8 can continue to perform its comparison operation, while the count information display means 7 continues to display successively the current number of copied or printed sheets. However, when the value to be compared becomes equal to the reference value as the copying operation proceeds, that is, when the number of the copied sheets has attained the predetermined number, the comparator circuit 8 will produce the second control signal in place of the first control signal, as a result of which the operation of the copying machine is stopped by means of the control means 5. The counter circuit 2 is then reset to the state in which the preset information is placed therein. The display means 7 also turns to the state to display continuously the preset information. In other words, when the number of signals from the operation signaling means 1 has attained the predetermined number, the counter circuit 2 will at first feed the count information based on said number to the comparator circuit 8. However, if the second control signal is supplied from the comparator circuit 8, the counter circuit 2 will then immediately supply the preset information from the preset means 3 to the comparator circuit 8 and the count information display means 7, the latter then being caused to restore the original state before the initiation of the copying operation.

In case the preset means 3 is erroneously actuated inadvertently during the copying operation and the preset value is altered to the number less than the number of sheets which have been already printed, the value to be compared (count information) becomes greater than the reference value (preset information). The comparator circuit 8 then immediately produces the second signal to convey the operation stop command to the copying machine. In this manner, the copying machine can be restored to the original state before the initiation of the copying operation.

In the illustrated embodiment, the preset counter apparatus has been shown and described as applied to the copying machine. However, it should be appreciated that the counter apparatus according to the present invention can be used for many other machines and apparatus. Furthermore, it is not always necessary to restrict the relation between the actuation signal and the count information to one-to-one correspondence. It is of course possible to employ the correspondence relation of a single information for plural times of actuations or operations.

The counter apparatus according to the present invention presents following advantages:

a. Even if the counter is accidently erroneously operated, such undesirable condition that the utilization apparatus or machine would not be stopped can be effectively evaded.

b. The application of the start signal is effected independently from the comparator circuit, whereby the erroneous operation possibly caused by noises can be excluded.

c. By connecting the count information display apparatus directly to the counter circuit as is in the case of the illustrated embodiment, the preset number can be displayed before or after the operation of the machine, while, during operation, the value corresponding to the number of the operations or actuations of the machine can be continuously displayed.

While the invention has been described with reference to a preferred embodiment, it should be apparent for those skilled in the art that many changes and modifications may be made in the form of the invention without departing from the scope and spirit thereof.

As hereinbefore explained, the present invention relates to a preset counter for a copying machine using TTL (transistor transistor logic) components, DTL (diode transistor logic) components as digital integrated circuits and relays. In the integrated circuit for the counter of the present invention, not only the TTL and DTL components, but also a digital IC (integrated circuit) component for sequence operation can be employed, such as P·MOS, N·MOS and C·MOS devices. The copying machine includes a conventional high voltage source and AC motor operated thereby, so that many kinds of electrical noises are generated therein. Further, the preset value on the copy dial may be often altered by the operator during copying operations. According to the copy counter of the present invention, the copying machine can be operated accurately even if the electric noises are generated and the preset value is altered.

Figure 3:
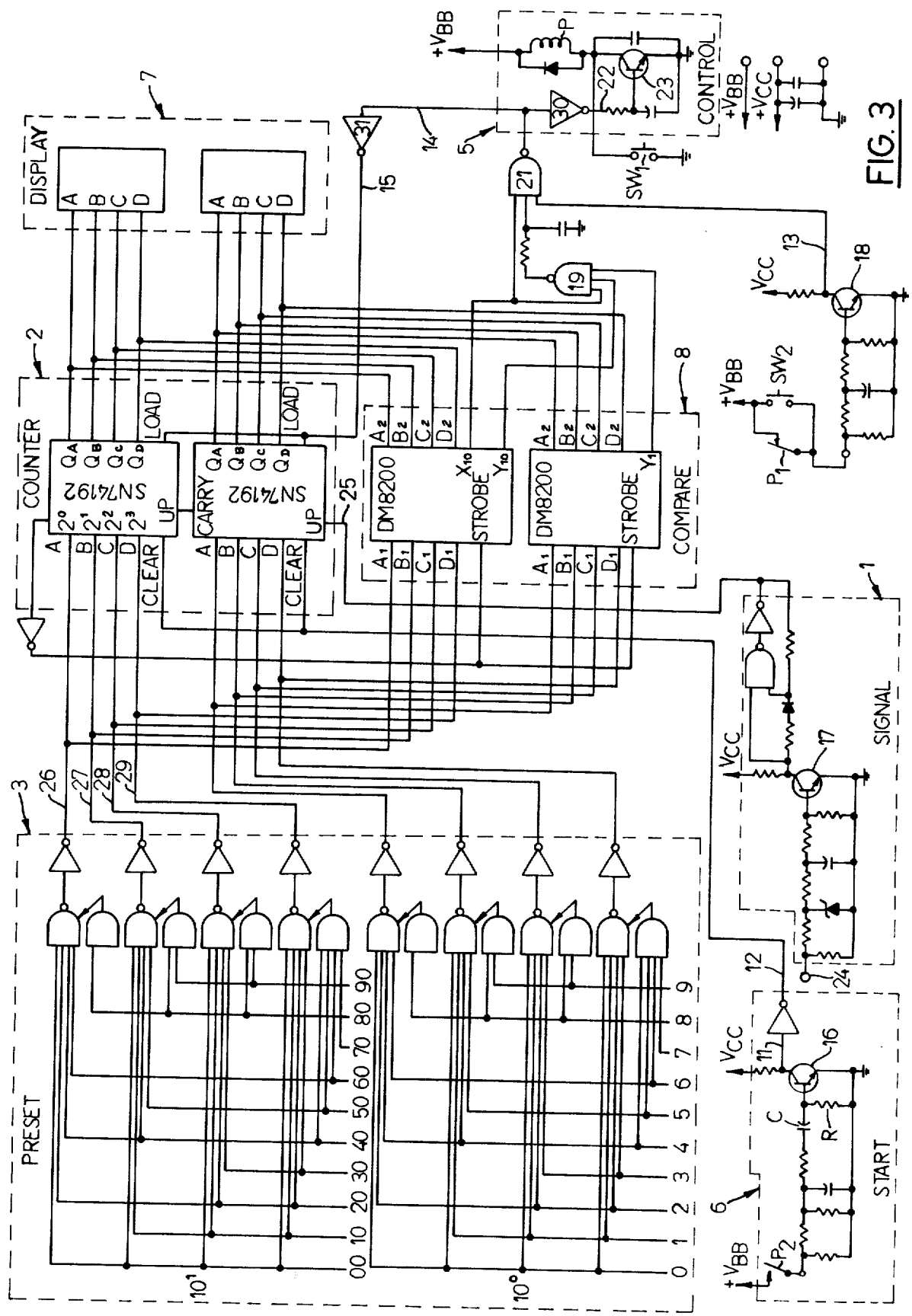
FIG. 3 is a diagram of an electric circuit corresponding to the block diagram shown in FIG. 2.

An embodiment of the present invention using widely known types of digital IC components is shown in the attached FIG. 3. The portions of the circuit designated 1, 2, 3, 5, 6, 7 and 8 in FIG. 2 of the application drawing are designated by same numerals in FIG. 3. The additional reference numerals referred to hereinafter are shown in FIG. 3.

In FIG. 3, a normally closed contact $P_1$ is shown closed, so that a voltage is applied to the base of a transistor 18 and the collector output 13 thereof is at low level. Accordingly, an output line 14 of a NAND device 21 becomes high level and an output line 15 connected to a load terminal of the counter 2 through an inverter 31 becomes low level. This results in the counter 2 being in a preset state, so that the counter indicates the preset value of the copy dial.

As stated above, the indication of the counter coincides with the preset value and therefore the comparator 8 to which the indication of the counter and the preset value are applied as inputs produces an output of $X_{10}=H$, $Y_{10}=H$ and $Y_1=H$ as a coincident output. Accordingly, one of the input gates of the NAND device 21 becomes low state. "H" indicates "high level," and "L" indicates "low level."

When a copy button switch $SW_1$ is pushed in order to start the copying operation, a relay P is actuated, thereby operating the contact $P_1$ to open and the gate 13 of the NAND device 21 becomes high level. At the same time, a normally open contact $P_2$ of the relay P is closed and a differential pulse generated by an RC circuit in an input circuit of a transistor 16 is applied to the base of the transistor 16. Accordingly, a low level pulse appears on the collector 11 of the transistor 16 which, in turn, is changed to a high level pulse by an inverter and applied to a clear terminal of the counter 2 in order to clear it.

In this case, the required counter integrated circuits must be of a type in which the clear terminal is superior to the load terminal, and Texas Instrument type SN 74192 integrated circuits (synchronous 4-bit up/down counters having dual clock with clear) were found to be suitable devices. When the counter 2 output is cleared, the preset 3 value becomes larger than the counter 2 output, both being applied to the comparator 8, so that the comparator output of $X_{10}=H$, $Y_{10}=L$ and $Y_1=L$ is generated. Because the inputs to the NAND device 21 all become high level, the output line 14 becomes low level and the preset command of the counter 2 is cancelled. An output 22 through an inverter 30 becomes high level and is applied to the base of a transistor 23 in order to actuate it so that the relay P is held in the ON state.

Because the preset state of the counter 2 is cancelled, the counter 2 is operated to count the number of copies and the function of the indicating portion is changed from the preset value indicating state to the count value indicating state.

When the copying operation of the machine is started, electric signals generated each time a copy is made, for example, by a cam in association with the machine and responsive to operation thereof are applied to an input terminal 24 of the counter 2 and a low level pulse is generated at the collector of a transistor 17 which in turn is applied to an up counter terminal 25 of the counter 2 through a hysteresis circuit in order to count a copy number.

When the copy number is increased and coincides with the preset value of the copy dial, the comparator 8 produces an output of $X_{10}=H$, $Y_{10}=H$ and $Y_1=H$, so that the output of a NAND device 19 becomes low level, the output 14 of the NAND device 21 becomes high level and the output of the inverter 30 becomes low level, so that the transistor 23 and output relay P assume an OFF state. Further, the contact $P_1$ returns to closed state and the gate 13 of the NAND device 21 is locked at low level. Therefore, even if the spike noise is applied from the outside to the clear terminal of the counter 2 so as to clear the counter in the stop mode of the machine, the counter is preset soon and stabilized.

As FIG. 3 shows, the components in preset 3 may take the form, for example, of four HD2204 dual 4-input NAND/NOR Gate devices and four type HD2202 Dual 4-Input Expander devices, such devices being available from Hitachi, Ltd., Tokyo, Japan, 6-2,2-chome, Otemachi, Chiyoda, Tokyo 100.

As FIG. 3 further shows, the comparator 8 may employ Type DM8200 4-bit integrated circuit comparators available from National Semiconductor Corporation, Santa Clara, Calif. 95015.

As FIG. 3 shows, counter 2 may employ Type SN74192 synchronous 4-bit up/down controls (dual clock with clear) available from Texas Instruments, Incorporated, Post Office Box 5012, Dallas, Tex. 75222.

What we claimed is:

1. A preset counter apparatus comprising a comparator circuit for producing a first control signal when a value to be compared is smaller than a reference value and producing a second control signal when said value to be compared is equal to or greater than said reference signal, a control means actuated by said second control signal from said comparator circuit to control operation of a utilization machine, a preset means to preset a preselected number of said machine operations and supply said preset information to said comparator circuit as said reference value, means operatively interlocked with said machine operations to generate signals represetative of said operations, a counter circuit to count said operation representing signals and apply the count information thereof to said comparator circuit as said value to be compared with said reference value, and a start signal means to supply a machine operation start signal to said counter circuit, wherein said counter circuit is so arranged as to usually hold therein said preset information from said preset means and, upon application of a signal from said start signal means, to clear said preset information and begin to count the number of signal from said operation representing signal means starting from zero state, said counter circuit, upon beginning said count, being maintained in the state in which said preset information is cleared by means of said first control signal from said comparator circuit and, upon receiving said second control signal from said comparator circuit, being restored to said usual state, and at the same time resetting said start signal means to the original state before the operation was initiated.

2. Preset counter apparatus according to claim 1, wherein said utilization machine is a copying machine.

3. Preset counter apparatus according to claim 2, wherein said operation signal means produces said operation representing signal for every rotation of a photo-printing drum of said copying machine.

4. Preset counter apparatus according to claim 1, wherein said control means is operative to stop the operation of said utilization machine.

5. Preset counter apparatus according to claim 1, further comprising a count information display means connected to said counter circuit.

6. Preset counter apparatus according to claim 1, further comprising a pushbutton switch for stopping the copy operation at any time.

* * * * *